United States Patent
Akao et al.

(10) Patent No.: US 7,123,913 B2
(45) Date of Patent: Oct. 17, 2006

(54) CELLULAR TELEPHONE

(75) Inventors: Masahide Akao, Kyotanabe (JP);
Michiyuki Yamaoka, Katano (JP);
Masayoshi Masuda, Sakai (JP)

(73) Assignee: Sanyo Co Ltd., Osaka-Fu (JP)

( * ) Notice: Subject to any disclaimer, the term of this patent is extended or adjusted under 35 U.S.C. 154(b) by 0 days.

(21) Appl. No.: 10/489,946

(22) PCT Filed: Feb. 27, 2002

(86) PCT No.: PCT/JP02/01772

§ 371 (c)(1),
(2), (4) Date: Sep. 13, 2004

(87) PCT Pub. No.: WO03/032671

PCT Pub. Date: Apr. 17, 2003

(65) Prior Publication Data

US 2005/0020264 A1    Jan. 27, 2005

(30) Foreign Application Priority Data

Sep. 28, 2001    (JP) .............................. 2001-304655

(51) Int. Cl.
*H04Q 7/20* (2006.01)
(52) U.S. Cl. ...................... 455/436; 455/437; 455/438; 455/439; 370/331; 370/335
(58) Field of Classification Search ................ 455/436, 455/437, 438, 439, 442; 370/331, 332, 333, 370/334, 335
See application file for complete search history.

(56) References Cited

U.S. PATENT DOCUMENTS

| | | | |
|---|---|---|---|
| 5,627,835 A | 5/1997 | Witter | |
| 5,872,774 A * | 2/1999 | Wheatley et al. | 370/335 |
| 5,999,816 A * | 12/1999 | Tiedemann et al. | 455/437 |
| 6,122,513 A * | 9/2000 | Bassirat | 455/443 |
| 6,775,252 B1 * | 8/2004 | Bayley | 370/328 |
| 6,944,143 B1 * | 9/2005 | Bayley et al. | 370/332 |
| 2002/0022463 A1 | 2/2002 | Mori et al. | |
| 2002/0072370 A1 * | 6/2002 | Johansson et al. | 455/436 |

FOREIGN PATENT DOCUMENTS

| WO | WO 99/23847 | 5/1999 |
|---|---|---|
| WO | 01/17125 A | 3/2001 |

* cited by examiner

*Primary Examiner*—Matthew D. Anderson
*Assistant Examiner*—Tuan Pham

(57) ABSTRACT

A cellular telephone (100) that searches for a destination base station in accordance with a handoff instruction receives a soft handoff instruction or a hard handoff that is able to specify a first search window size. When the hard handoff instruction is received, a search block (70) is controlled so that a window control block (83) searches for pilot signals from neighboring base stations using a search window having a size larger than one of the first search window size and a third search window size that is used when the soft handoff instruction is received.

6 Claims, 5 Drawing Sheets

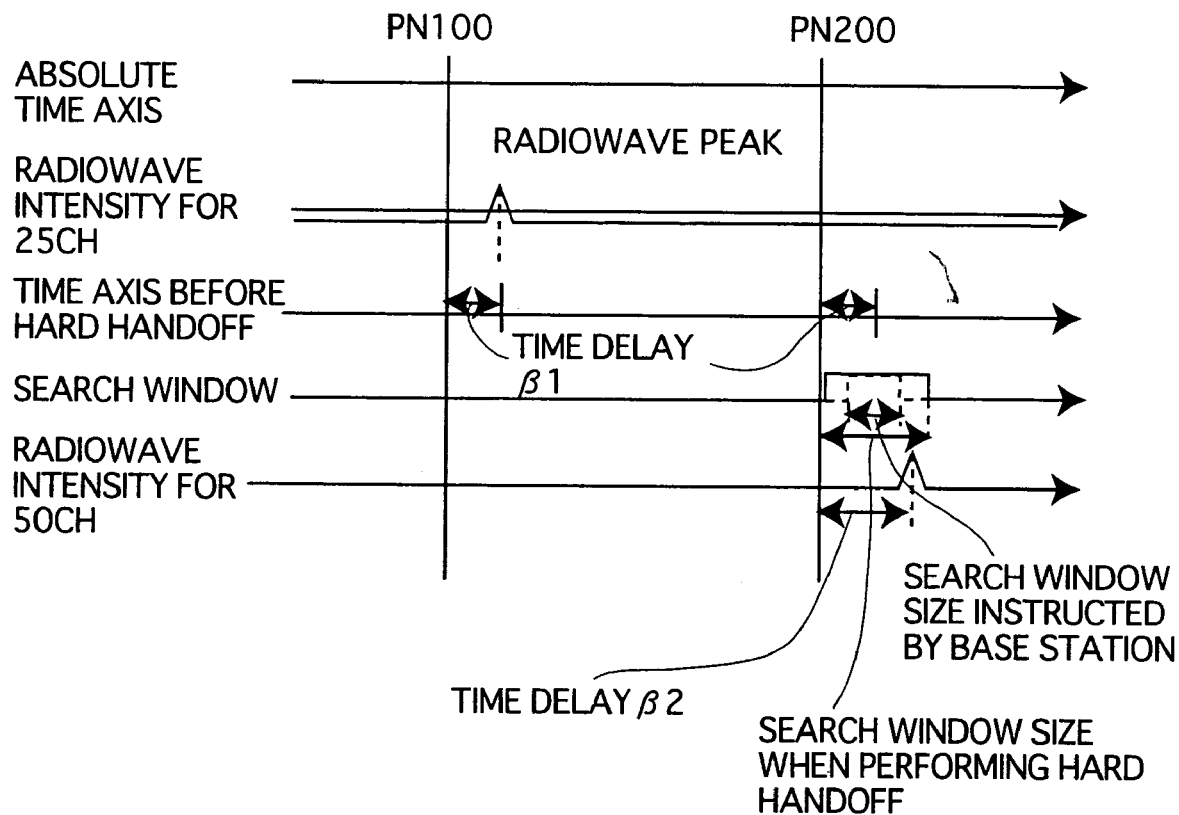

CELLULAR TELEPHONE

TECHNICAL FIELD

The present invention relates to a handoff in a CDMA cellular telephone system.

BACKGROUND ART

A CDMA cellular telephone performs a handoff as the cellular telephone moves from one cell to another, in order to switch the communication channel from a currently communicating base station (also referred to as "previous base station") to a destination base station. There are two types of handoffs: a soft handoff and a hard handoff. When performing the soft handoff, the cellular telephone starts communicating with the destination base station using the same frequency as the frequency currently used, before closing the communication with the communicating base station. When performing the hard handoff, the cellular telephone starts a communication, after closing the communication with the communicating base station, with the destination base station in a different base station group, having a different frequency allocation, or having a different frame offset.

The soft handoff is performed based on pilot intensities of neighboring base stations. A pilot intensity is an intensity of a pilot channel common to the neighboring base stations, but outputted at a different spread timing from each base station, and also indicates a ratio of reception pilot energy in an entire reception energy. The cellular telephone measures the pilot intensities of the neighboring base stations on a regular basis, and notifies the communicating base station of the measured intensities. If any of the neighboring base stations is noted to have a sufficient pilot intensity that is stronger than the communicating base station, the communicating base station instructs the cellular telephone to perform a soft handoff to switch to the noted neighboring base station. Because the cellular telephone has already specified the spread timing (a synchronization timing) of all of the neighboring base stations by measuring the pilot intensities, the cellular telephone can synchronize with the noted neighboring base station as soon as the soft handoff instruction is received.

On the other hand, the hard handoff is for switching base stations that are in different base station groups or have different frequency allocations or different frame offsets, and a hardware structure does not allow the cellular telephone to measure a pilot intensity of the destination base station before actually performing the handoff. Therefore, the cellular telephone measures the pilot intensity of the destination base station only after the hard handoff instruction is received from the communicating base station, and specifies the synchronization timing of the destination base station based on the measurement. When measuring the pilot intensity of the destination base station, the cellular telephone estimates the synchronization timing of the destination base station based on the synchronization timing of the previous base station, and then sets a search window in accordance with the estimated synchronization timing and measures the pilot intensity during a period that the search window indicates.

As has been described, the search window in the hard handoff is set based on the synchronization timing of the previous base station. Accordingly, when radiowaves from the destination base station delay considerably due to reflections and such, a pilot signal peak of the destination base station falls outside the search window and the cellular telephone fails to acquire the synchronization timing of the destination base station. Such a failure of the handoff would cease a telephone call.

DISCLOSURE OF THE INVENTION

In view of the above noted problem, the present invention aims to provide a cellular telephone having an increased rate of successful handoffs in a CDMA cellular telephone system.

In order to achieve the above object, a cellular telephone according to the present invention is such that the cellular telephone that searches for a destination base station in response to a handoff instruction, comprising: a receiving unit operable to receive the handoff instruction from a current base station, the handoff instruction being one of a soft handoff instruction and a hard handoff instruction that is able to include information indicating a first search window size; and a searching unit operable, when the received handoff instruction is the hard handoff instruction, to search for a pilot signal from a neighboring base station using a search window that is larger in size than at least one of the first search window size and a second search window size that is predetermined for the soft handoff instruction.

The above problem does not occur in a case of the soft handoff because a pilot search of the neighboring base stations is performed prior to an actual soft handoff and the actual handoff is performed only after the timing of the pilot channel is acquired. On the other hand, in a case of the hard handoff, a pilot search of the destination base station is not performed prior to an actual handoff, and accordingly the above problem could easily happen. The present invention makes it possible to suppress failures in hard handoffs even when a time delay between radiowaves from the communicating base station and the destination base station is large, by absorbing the time delay using a large search window.

BRIEF DESCRIPTION OF THE DRAWINGS

FIG. 4 illustrates a relation between radiowave intensities of the base stations A and B, and the search window.

BEST MODE FOR CARRYING OUT THE INVENTION

The following describes a preferred embodiment of the present invention with reference to drawings.

Figure 1:
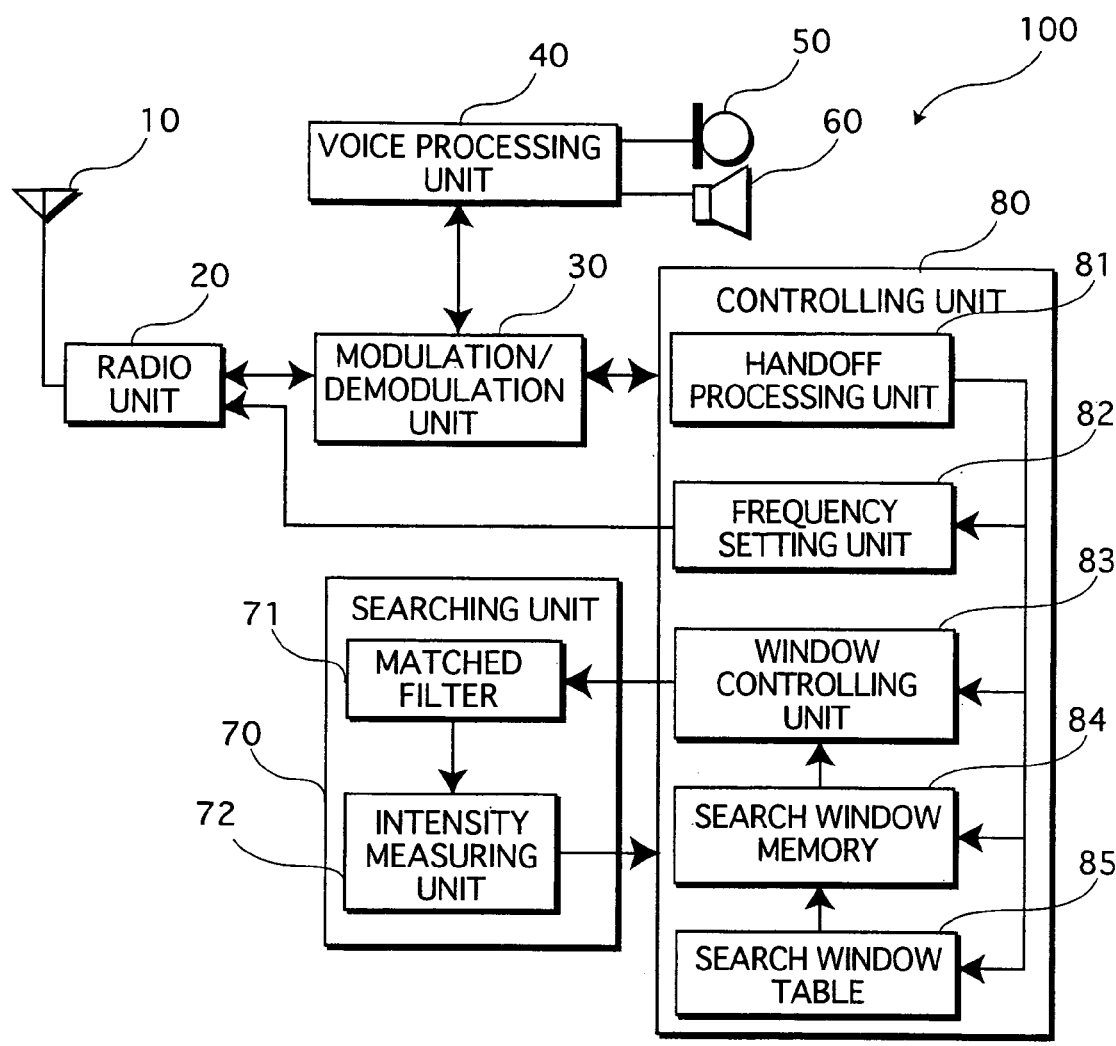
FIG. 1 is a block diagram illustrating a structure of a cellular telephone of an embodiment of the present invention.

FIG. 1 is a block diagram illustrating a structure of a cellular telephone of an embodiment of the present invention.

In the drawing, a cellular telephone 100 includes an antenna 10, a radio unit 20, a modulation/demodulation unit 30, a voice processing unit 40, a microphone 50, a speaker 60, a searching unit 70, and a controlling unit 80.

The radio unit 20 is for converting frequencies between a wireless part (between a base station and the antenna 10) and the modulation/demodulation unit 30. Based on an instruction from the controlling unit 80, the radio unit 20 is able to convert the frequencies according to a frequency assignment to a traffic channel.

The modulation/demodulation unit 30 is made mainly of a modulation subunit that performs a narrowband modulation and a spread modulation, and a demodulation subunit that performs a reverse-spread demodulation.

The voice processing unit 40 performs a CODEC processing of voices that are inputted via the microphone 50 and outputted via the speaker 60.

The searching unit 70 includes such as a matched filter 71 and an intensity measuring unit 72, and performs a pilot search of neighboring base stations while in a communication with a currently communicating base station, and a pilot search for a destination base station when performing a hard handoff.

The pilot search is an operation in which a search window is set in order to search available multipath components of a pilot channel, i.e. multipath components that the cellular telephone 100 can use in order to demodulate a corresponding receiving traffic channel. A size of the search window is determined based on an instruction from the communicating base station. The pilot channel is a series of signals transmitted from each base station. Using the pilot channel, the cellular telephone can acquire the timing of reception CDMA channel. Base stations are identified by different pilot PN series offsets. Specifically, the pilot channel is outputted from each of the base stations at 512 different timings, because a cycle of the PN series is two to the fifteenth power. By identifying a particular timing of the pilot channel, the cellular telephone can identify a particular base station that corresponds to the pilot channel.

The cellular telephone 100 searches pilot channels on the current CDMA frequency allocation when performing the pilot search of the neighboring base stations, detects the pilot channels of the neighboring base stations, and measures intensities of the detected pilot channels. When a detected pilot channel from any of the neighboring base stations has a sufficient intensity, the cellular telephone 100 notifies the communicating base station of a pilot intensity measurement result, and the communicating base station instructs the cellular telephone to perform a handoff in response.

The cellular telephone 100 performs a synchronization acquisition of the destination base station by the pilot search of the destination base station in the hard handoff. The synchronization acquisition is an operation so as to synchronize a timing of a spread code of the cellular telephone with a spread code for the received signals.

The matched filter 71 performs a correlation detection based on a convolution integral of the reception signals and PN series, while a signal that indicates a period in which the search window is open and that is transmitted from a window controlling unit 83 is inputted.

The intensity measuring unit 72 measures the pilot intensity of the pilot channel by adding, to a result of the correlation detection by the matched filter 71, a proportion between a received pilot energy per chip Ec and a total amount of spectral densities received via the multipath components (noise and signals) Io. Further, the intensity measuring unit 72 specifies the peak position by measuring the intensity, and detects the pilot channel timing.

The controlling unit 80 is made of such as a CPU, RAM, and ROM (not shown in the drawings). Various controls are performed by the CPU executing different programs stored in the ROM.

Functionally, the controlling unit 80 includes a handoff processing unit 81, a frequency setting unit 82, the window controlling unit 83, a search window memory 84, and a search window table 85.

The handoff processing unit 81 perform a handoff by controlling each unit, upon reception of a handoff instruction from the communicating base station. More specifically, the handoff processing unit 81 first specifies a handoff type, a frequency assignment, a pilot PN series offset index, search window size information, and such, by the handoff instruction. The handoff type indicates either the soft handoff or the hard handoff. The frequency assignment indicates a frequency assigned to the destination base station, and is not included in the instruction when the handoff type indicates the soft handoff. The pilot PN series offset index indicates a number of the PN offsets (each contain 64 PN chips) per pilot of the destination base station. The search window size information indicates a size of the search window used for the pilot search, and is not always contained in the instruction.

Next, the handoff processing unit 81 controls the radio unit 20 so as to perform a frequency conversion by synchronizing the frequency of the specified frequency assignment.

Further, the handoff processing unit 81 reads, from the search window table 85, a search window size corresponding to the received search window size information, and stores the received search window information and the read window size parameter in the search window memory 84.

Further, the handoff processing unit 81 notifies the window controlling unit 83 of the pilot PN series offset index and the handoff type.

The frequency setting unit 82 controls switching frequencies at the radio unit 20, according to the frequency assignment of the destination base station indicated in the handoff instruction analyzed by the handoff processing unit 81.

Figure 2:
FIG. 2 is a diagram illustrating a search window table.

The search window table 85 is a search window table as illustrated in FIG. 2. As shown in the drawing, the search window table includes the search window information on the left column and window size parameters each corresponding to the search window information on the right column. Each of the window size parameters correspond to a number of PN chips of a search window that is used when searching the pilot channel.

The received search window information and the corresponding window size parameter that is read from the search window table 85 by the handoff processing unit 81 are stored in the search window memory 84.

The window controlling unit 83 notifies the matched filter 71 of the timing of the search window in the pilot search based on the search window information and the corresponding window size parameter stored in the search window memory 84. During communication, the window controlling unit 83 performs the pilot search with a center of the search window size indicated by the window size parameter being set at the pilot PN series offset of each of the neighboring base stations.

When the handoff type indicates the hard handoff, the window controlling unit 83 reads the search window information stored in the search window memory 84, increments a number in the search window information by 1, and read a window size parameter corresponding to the incremented number of the search window information from the search window table 84. Then, the window controlling unit 83 performs the pilot search of the destination base station with setting the pilot PN series offset of the destination base station as a center of the search window with a size indicated by the window size parameter that is read from the search window table 84.

By the above structure, in a case of the hard handoff, the cellular telephone 100 performs the pilot search of a destination base station using a search window having a size larger than a size indicated by the window size parameter stored in the search window memory. Accordingly, the pilot search in the hard handoff is performed using a search window with a larger size than the window size for the soft handoff or the window size instructed by the communicating base station.

Figure 3A:
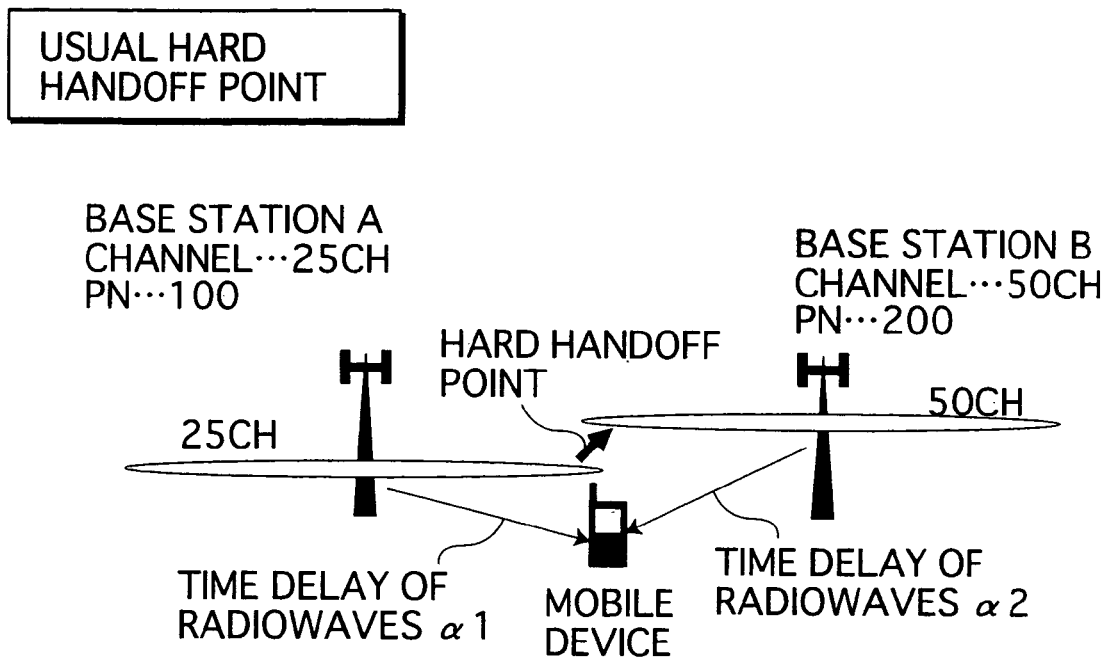
FIG. 3A illustrates a usual hard handoff point.
Figure 3B:
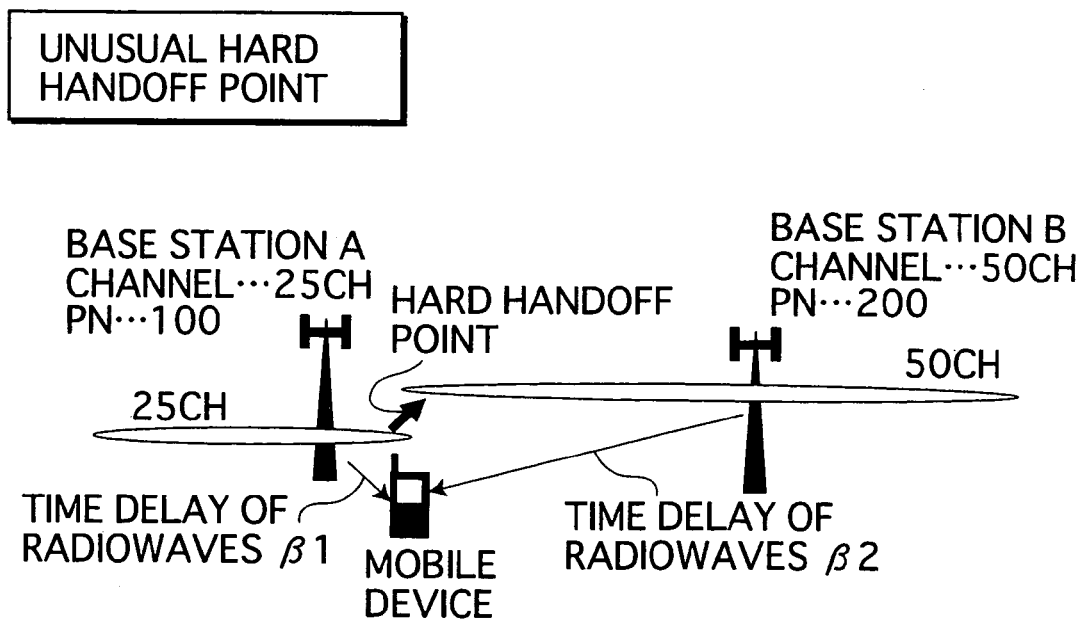
FIG. 3B illustrates an unusual hard handoff point.

FIG. 3A illustrates a usual hard handoff point, and FIG. 3B illustrates an unusual hard handoff point.

In FIGS. 3A and 3B, when the cellular telephone performs a hard handoff and switches a communication from a base station A to a base station B, the cellular telephone sets a search window of a pilot search for the base station B using radiowaves from the base station A as a base. Specifically, a search window timing is determined based on a time delay of the radiowaves from the base station A.

In FIG. 3A, the cellular telephone (a mobile device in the drawings) is positioned about halfway between the base stations A and B, and a time difference between a time delay $\alpha 1$ (a time delay of the radiowave from the base station A) and a time delay $\alpha 2$ (a time delay of the radiowave from the base station B) is not large. Therefore, the time difference is absorbed in the search window size that has been instructed in the hard handoff instruction by the base station A, or the search window size used in a previous pilot search.

On the other hand, in FIG. 3B, the cellular telephone (a mobile device in the drawings) is positioned close to the base station A and remote to the base station B, and a time delay of radiowaves from the base station B becomes larger because there are more reflections against buildings and such. Accordingly, a time difference between a time delay $\beta 1$ (a time delay of the radiowave from the base station A) and a time delay $\beta 2$ (a time delay of the radiowave from the base station B) becomes larger than the case in FIG. 3A, and in some cases, the time difference cannot be absorbed in the search window size that has been instructed in the hard handoff instruction by the base station A, or the search window size used in a previous pilot search. When the time difference cannot be absorbed, the cellular telephone fails to acquire pilot signals from the base station B, and as a result, the telephone call stops because of a failure in the hard handoff.

In a case of a soft handoff, such a problem does not occur because the soft handoff is performed after acquiring the timing of the pilot channel by performing the pilot search of the neighboring base stations in advance. On the other hand, hard handoffs are susceptible to such a problem, because a pilot search prior to an actual hard handoff is not performed. The present invention aims to prevent handoff failures even in the case of hard handoffs, by making the search window larger so as to absorb the time difference even when the time difference between the communicating base station and the destination base station is large.

FIG. 4 illustrates a relation between radiowave intensities of the base stations A and B, and the search window.

In the drawing, a left-to-right direction indicates a time flow. A PN100 indicates a pilot PN offset index of the base station A, and a PN 200 indicates a pilot PN offset index of the base station B. During the communication with the base station A (whose frequency assignment is 25 ch), the cellular telephone 100 detects a radiowave peak from the radiowave intensity of signals from the base station A, and obtains and stores the time delay $\beta 1$ by calculating the detected peak and a base time of the PN100. Upon reception of a hard handoff instruction to the base station B (whose frequency assignment is 50 ch), the window controlling unit 83 estimates a timing of the PN200 and a timing that is $\beta 1$ minutes behind the timing of the PN200, based on the base time of the PN100 and the time delay $\beta 1$. Then based on the timing that is $\beta 1$ minutes behind the timing of the PN200, the window controlling unit 83 opens a search window having a size larger than a size instructed by the base station A or a size stored in the cellular telephone 100 in advance. Although the radiowave peak of the signals from the base station B is behind by the time delay $\beta 1$, the peak can be detected within the search window because the search window is large.

Figure 5:
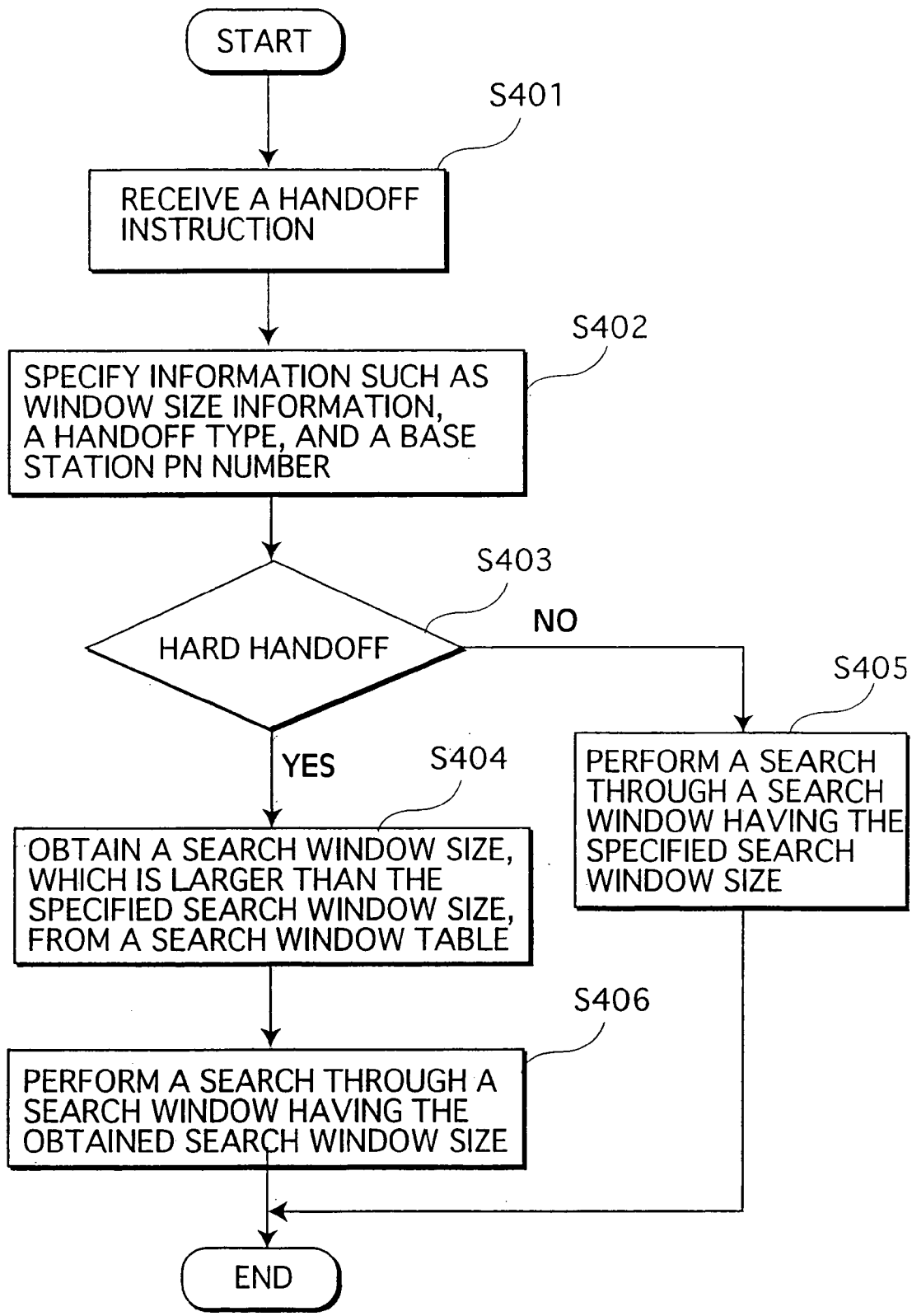
FIG. 5 is a flow chart illustrating an operational procedure mainly of a controlling unit 80.

FIG. 5 is a flow chart illustrating an operational procedure mainly of a controlling unit 80.

When the handoff processing unit 81 receives a handoff instruction from the communicating base station, the handoff processing unit 81 specifies a handoff type, a frequency assignment, a pilot PN series offset index, search window size information, and such, by analyzing the received handoff instruction, and then transmits necessary information to the frequency setting unit 82, the window controlling unit 83, and such (Steps S401 and S402).

The window controlling unit 83 identifies whether or not the handoff type is the hard handoff. If the handoff type is the hard handoff, the operation proceeds to Step S404, and if not, proceeds to Step S405 (Step S403).

The window controlling unit 83 obtains, from the search window table 85, a search window size that is larger by 1 size than the search window size that is stored in the search window memory 84, or contained in the handoff instruction (Step S404). Next, the window controlling unit 83 controls the matched filter 71 so as to open a search window with the size obtained in Step S404 at the timing estimated in a manner explained using FIG. 4, and have the matched filter 71 and the intensity measuring unit 72 perform the pilot search (Step S406).

On the other hand, if the handoff type is not the hard handoff, the window controlling unit 83 uses the search window size either stored in the search window memory 84 or contained in the handoff instruction, and have the matched filter 71 and the intensity measuring unit 72 perform the pilot search.

INDUSTRIAL APPLICABILITY

A cellular telephone of the present invention has a high success rate in handoffs, and is useful for a CDMA cellular telephone that is required to have a high communication quality.

The invention claimed is:

1. A cellular telephone that searches for a destination base station in response to a handoff instruction, comprising:
    a receiving unit operable to receive the handoff instruction from a current base station, the handoff instruction being one of a soft handoff instruction and a hard handoff instruction that is able to include information indicating a first search window size; and
    a searching unit operable, when the received handoff instruction is the soft handoff instruction, to search for a pilot signal from a neighboring base station using a search window of a second search window size, and operable, when the received handoff instruction is the hard handoff instruction, to search for a pilot signal from a neighboring base station using a search window that is larger in size than at least one of the first search window size and the second search window size that is predetermined for the soft handoff instruction.

2. A cellular telephone according to claim 1, wherein the searching unit comprises:
   a storage subunit that stores information indicating the second search window size;
   a judging subunit operable to judge whether the received handoff instruction is the hard handoff instruction; and
   a searching subunit operable to search for the pilot signal from the neighboring base station,
   the search being performed (i) using the search window that is larger in size than at least one of the first and second search window sizes when the judgment is in the affirmative, and (ii) using a search window having the same size as one of the second search window size and a third search window size that is specified by the received handoff instruction, when the judgment is in the negative.

3. The cellular telephone of claim 1 further including in the searching unit a search window table setting a priority of search window sizes from the smallest to the largest search window size and a search window memory storage unit for storing search window size information corresponding to the search window table wherein the searching unit automatically sets the search window size one size larger than the first search window size when a hard handoff instruction is received.

4. A method used for a cellular telephone that searches for a destination base station in response to a handoff instruction, the method comprising:
   a receiving step of receiving the handoff instruction from a current base station, the handoff instruction being one of a soft handoff instruction and a hard handoff instruction that is able to include information indicating a first search window size; and
   a searching step of, when the received handoff instruction is the soft handoff instruction, searching for a pilot signal from a neighboring base station using a search window of a second search window size, and when the received handoff instruction is the hard handoff instruction, searching for a pilot signal from a neighboring base station using a search window that is larger in size than at least one of the first search window size and the second search window size that is predetermined for the soft handoff instruction.

5. A program that has a cellular telephone execute a search for a destination base station in response to a handoff instruction, the program comprising:
   a receiving step of receiving the handoff instruction from a current base station, the handoff instruction being one of a soft handoff instruction and a hard handoff instruction that is able to include information indicating a first search window size; and
   a searching step of, when the received handoff instruction is the soft handoff instruction, searching for a pilot signal from a neighboring base station using a search window of a second search window size, and when the received handoff instruction is the hard handoff instruction, searching for a pilot signal from a neighboring base station using a search window that is larger in size than at least one of the first search window size and the second search window size that is predetermined for the soft handoff instruction.

6. A cellular telephone that searches for a destination base station in response to a handoff instruction, comprising:
   a receiving unit operable to receive the handoff instruction from a current base station, the handoff instruction being one of a soft handoff instruction and a hard handoff instruction that is able to include information indicating a first search window size; and
   a searching unit operable, when the received handoff instruction is the hard handoff instruction, to search for a pilot signal from a neighboring base station using a search window that is larger in size than at least one of the first search window size and a second search window size that is predetermined for the soft handoff instruction wherein the searching unit comprises:
   a storage subunit that stores information indicating the second search window size;
   a judging subunit operable to judge whether the received handoff instruction is the hard handoff instruction; and
   a searching subunit operable to search for the pilot signal from the neighboring base station,
   the search being performed (i) using the search window that is larger in size than at least one of the first and second search window sizes when the judgment is in the affirmative, and (ii) using a search window having the same size as one of the second search window size and a third search window size that is specified by the received handoff instruction, when the judgment is in the negative.

* * * * *